US010293655B2

United States Patent
Hojo et al.

(10) Patent No.: US 10,293,655 B2
(45) Date of Patent: May 21, 2019

(54) VENTILATION STRUCTURE OF RADIATOR IN STRADDLE TYPE VEHICLE

(71) Applicant: HONDA MOTOR CO., LTD., Tokyo (JP)

(72) Inventors: Masayuki Hojo, Wako (JP); Ryuichi Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 887 days.

(21) Appl. No.: 13/950,828

(22) Filed: Jul. 25, 2013

(65) Prior Publication Data

US 2014/0034267 A1 Feb. 6, 2014

(30) Foreign Application Priority Data

Jul. 31, 2012 (JP) ................. 2012-170589

(51) Int. Cl.
| | | |
|---|---|---|
| *B60H 1/00* | (2006.01) | |
| *B62J 23/00* | (2006.01) | |
| *F01P 11/10* | (2006.01) | |
| *F01P 11/12* | (2006.01) | |

(52) U.S. Cl.
CPC .......... *B60H 1/00457* (2013.01); *B62J 23/00* (2013.01); *F01P 11/10* (2013.01); *F01P 11/12* (2013.01); *F01P 2050/16* (2013.01)

(58) Field of Classification Search
CPC ....... B60H 1/00457; F01P 11/10; F01P 11/12; F01P 2050/16; B60R 2011/0008; B62J 23/00
See application file for complete search history.

(56) References Cited

U.S. PATENT DOCUMENTS

| 4,632,206 A * | 12/1986 | Morinaka ................ B62J 17/02 |
| | | 165/41 |
| 7,143,854 B2 * | 12/2006 | Arnold ...................... F01P 3/18 |
| | | 180/219 |
| 8,857,553 B2 * | 10/2014 | Nakamura ................ F28D 1/00 |
| | | 180/219 |

(Continued)

FOREIGN PATENT DOCUMENTS

| JP | 11-278344 | 10/1999 |
| JP | 2011162062 A * | 8/2011 |

OTHER PUBLICATIONS

Kurkyakyn, "Chrome Shark Skin Radiator Grate", Grille Sold on 2009, WaybackMachine illustrates oldest time on 2011.*

(Continued)

Primary Examiner — Frantz F Jules
Assistant Examiner — Nelson J Nieves
(74) *Attorney, Agent, or Firm* — Rankin, Hill & Clark LLP (57) ABSTRACT

In a straddle type vehicle in which a radiator is covered with a cover member, and an air guide duct for guiding hot air from the radiator to an outside of the vehicle is formed integral with the cover member, the hot air is restrained from staying within the cover member even in the case where the air guide duct of the cover member covering the radiator must be opened face-to-face with only a portion of a core of the radiator. A ventilation control member for controlling cooling air passing through the core of the radiator so as to flow toward an inner opening of the air guide duct is provided in the vicinity of the radiator.

13 Claims, 7 Drawing Sheets

(56) References Cited

U.S. PATENT DOCUMENTS

| | | | | |
|---|---|---|---|---|
| 2009/0056916 A1* | 3/2009 | Yesin | ............ | F28D 1/05383 |
| | | | | 165/104.21 |
| 2009/0194980 A1* | 8/2009 | Kobayashi | ............ | B60R 21/16 |
| | | | | 280/728.3 |
| 2011/0114044 A1* | 5/2011 | Dees | ............ | F02F 1/40 |
| | | | | 123/41.82 R |
| 2012/0080249 A1* | 4/2012 | Yates, III | ............ | B60L 7/18 |
| | | | | 180/65.31 |

OTHER PUBLICATIONS

Eurekaboy, "Radiator Upgrade", WaybackMachine illustrates oldest time Jun. 6, 2012.*

* cited by examiner

VENTILATION STRUCTURE OF RADIATOR IN STRADDLE TYPE VEHICLE

BACKGROUND OF THE INVENTION

Field of the Invention

The present invention relates to a straddle type vehicle in which a radiator for cooling a coolant led from an engine body is covered with a cover member provided on a lateral side of a vehicle body, and an air guide duct having an inner opening opened in face-to-face relationship with the radiator on the lateral side of the vehicle body is formed integral with the cover member so as to guide hot air from the radiator outwardly of the vehicle, and more particularly to an improvement of a ventilation structure of the radiator.

Description of Related Art

A motorcycle having radiators arranged on left and right sides of a front part of a vehicle body and an air guide duct provided in a cover member for covering the radiator on a lateral side is already known in Japanese patent laid-open publication No. H11-278344.

In the case where the air guide duct must be opened in face-to-face relationship with only a portion of a core of the radiator for some reason and a remaining portion of the core is covered with the cover member, a portion of hot air passing through the core of the radiator stays within the cover member so that there is a possibility of causing a thermal influence.

SUMMARY OF THE INVENTION

The present invention has been made in view of the above described circumstances, and has an objective of providing a ventilation structure of a radiator in a straddle type vehicle, which is capable of preventing hot air from staying within a cover member even in the case where an air guide duct of the cover member covering the radiator must be opened in face-to-face relationship with only a portion of a core of the radiator.

In order to achieve the above object, according to one aspect of the present invention, there is provided a ventilation structure of a radiator in a straddle type vehicle comprising a radiator for cooling a coolant led from an engine body, a cover member provided on a lateral side of a vehicle body for covering the radiator, an air guide duct having an inner opening that is opened face-to-face with the radiator on the lateral side of the vehicle body and being formed integral with the cover member so as to guide hot air from the radiator outwardly of the vehicle, and a ventilation control member for controlling cooling air passing through a core of the radiator so as to flow to the inner opening of the air guide duct, wherein the ventilation control member is provided in the vicinity of the radiator. Since the ventilation control member is provided in the vicinity of the radiator, the cooling air passing through the core of the radiator is guided to flow to the inner opening of the air guide duct. Therefore, even in the case where the air guide duct is opened face-to-face with only a portion of the core, it is possible to restrain the hot air from staying within the cover member, and thereby prevent the thermal influence caused by the retention or stay of hot air.

According to another aspect of the present invention, the ventilation control member is attached to the radiator. Since the ventilation control member is attached to the radiator, the positional accuracy of the ventilation control member relative to the radiator can be improved and the accuracy of controlling the orientation of the cooling air can be improved.

According to a further aspect of the invention, there is provided a grille that is formed in a reticulated shape for preventing foreign matter from entering the radiator side and that is close to and facing the core of the radiator in a cooling air introducing direction, and wherein the ventilation control member of a flat plate shape is formed integral with the grille. Therefore, the grille and the ventilation control member each are arranged close to the core of the radiator so that the effect due to such arrangement of these members can be increased and may be performed by a single part, contributing to a reduction in the number of parts.

In further accordance with aspects of the invention, the radiator includes an inlet side tank having an inlet pipe, an outlet side tank having an outlet pipe, the core being located between the inlet side tank and the outlet side tank and formed such that a plurality of water pipes and a plurality of cooling fins are arranged alternately and connected to each other, and a pair of side plates are arranged on both sides of the core so as to protect the core and located between the inlet side tank and the outlet side tank, wherein the side plates are integrally provided with a claw portion for attaching the ventilation control member and the grille thereto. Therefore, when the ventilation control member and the grille are attached to the side plates, which are adjacent to the core and assembled simultaneously with the core, the ventilation control member and the grille formed integral with the ventilation control member can be arranged adjacent to the core while improving the positional accuracy relative to the core.

In accordance with another aspect of the invention, an extending wall extending toward the air guide duct is provided on an outer periphery of an assembly unit comprising the ventilation control member and the grille formed integral with the ventilation control member. Since the extending wall is provided on the outer periphery of an assembly unit comprising the ventilation control member and the grille, the hot air passing through the radiator can be guided more assuredly to the air guide duct side by the extending wall, and prevent the hot air from leaking in the cover member.

According to another aspect of the present invention, a reticulated protrusion, which is connected to the reticulated grille, is formed integral with a portion of the ventilation control member facing the air guide duct. Since the reticulated protrusion is formed integral with the ventilation control member at a position facing the air guide duct, it is possible to improve the rigidity of the ventilation control member while reducing the weight thereof. It is also possible to improve the design quality when the air guide duct is viewed from the outside.

In accordance with another aspect of the invention, there is provided a straddle type vehicle comprising left and right radiators that are adapted to cool a coolant led from an engine body and arranged on both front lower sides of a vehicle driver in such a manner as to be covered with side cowls, a cooling air intake adapted to guide traveling air to the radiator and provided between the left and right side cowls and below a front cowl, an air guide duct having an inner opening that is opened face-to-face with the radiator from the outside and being formed integral with the side cowls so as to guide hot air from the radiator in an outward direction of a vehicle, and a ventilation control member for controlling cooling air passing through a core of the radiator so as to flow to the inner opening of the air guide duct, wherein the ventilation control member is provided in the vicinity of the radiator. Since the ventilation control member is provided in the vicinity of the radiators, which are arranged on both front lower sides of the vehicle driver in such a manner as to be covered with the side cowls, the cooling air passing through the core of the radiator is guided to flow into the inner opening of the air guide duct. Therefore, even in the case where the air guide duct is opened face-to-face with only a portion of the core, it is possible to restrain the stay of the hot air within the side cowl that has a great thermal influence on the driver, whereby to prevent the thermal influence causing due to the stay of the hot air.

In accordance with another aspect of the invention, an electric fan is arranged inwardly in a vehicle width direction of the radiator for discharging air sucked through the air guide duct from the cooling air intake, and a grille is formed in a reticulated shape for preventing foreign matter from entering the radiator side and arranged close to and face-to-face with the core of the radiator from the outside in the vehicle width direction, wherein the ventilation control member of a flat plate shape is formed integral with the grille. The reticulated grille for preventing the foreign matter from entering the radiator side when the air is guided from the air guide duct to the radiator side by the operation of the electric fan is located close to and facing the core of the radiator from the outside in the vehicle width direction, while being formed integral with the ventilation control member of a flat plate shape. Therefore, the grille and the ventilation control member each are arranged close to the core of the radiator so that the effect due to such arrangement of these members can be more increased and can be performed by a single part whereby to contribute to a reduction in the number of parts.

According to a further aspect of the invention, a tank shelter for covering a fuel tank arranged in front of a riding seat is connected to a rear portion of the side cowl, a side cover is arranged below a front portion of the riding seat and connected to a rear portion of the tank shelter, the air guide duct has a transverse cross sectional configuration inclined downwardly and rearwardly in a side view such that a portion of the core of the radiator excluding at least a rear upper portion thereof faces the air guide duct, and the ventilation control member is formed to close the rear upper portion of the core of the radiator in a side view.

Further according to the present invention, the air guide duct has a transverse cross sectional configuration inclined downwardly and rearwardly in a side view such that a portion of the core of the radiator excluding at least the rear upper portion thereof faces the air guide duct, and the ventilation control member is formed so as to close the rear upper portion of the core of the radiator in a side view. Therefore, although the rider sitting on the riding seat directly contacts the tank shelter connected to the rear portion of the side cowl and the side cover connected to the rear portion of the tank shelter, it is possible to effectively restrain the hot air from staying within the tank shelter and the side cover.

According to another aspect of the invention, the radiator is formed of a side flow type having a plurality of water pipes for carrying the coolant in a forward and rearward direction of the vehicle, and the inner opening of the air guide duct is formed such that the traveling air flows around at least a portion of all the water pipes of the radiator. Since the inner opening of the air guide duct is formed such that the traveling air flows around at least a portion of all the water pipes of the side flow type radiator, the cooling performance of the radiator can be maintained.

DETAILED DESCRIPTION OF THE PREFERRED EMBODIMENT

The embodiment of the present invention will be described hereunder with reference to accompanying drawings of FIG. 1 to FIG. 7. In the following description, the orientation such as upper, lower, left and right is set on the basis of a rider riding on a motorcycle.

Figure 1:
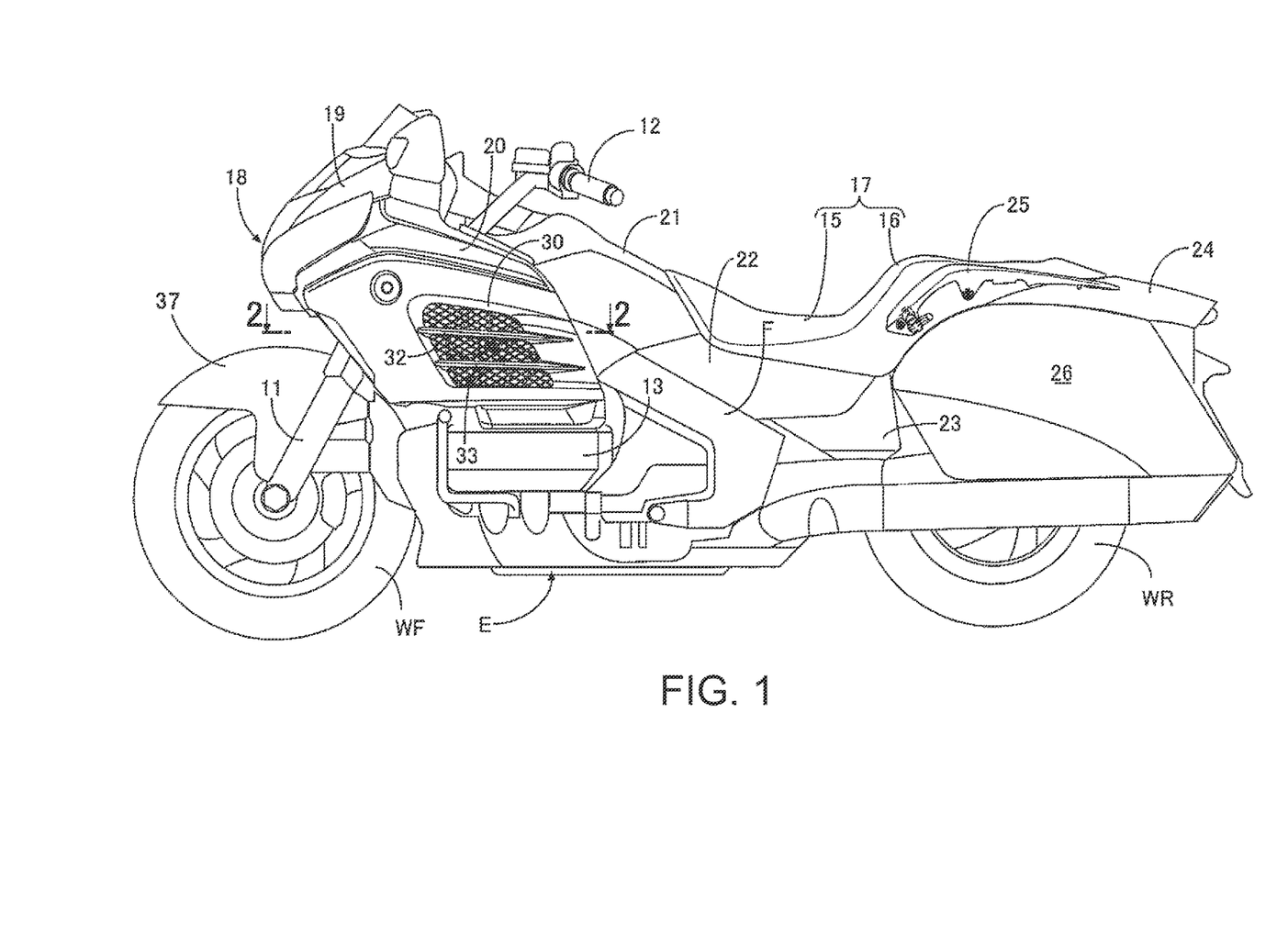
FIG. 1 is a left side elevational view of a motorcycle.

Referring first to FIG. 1, on an front end portion of a vehicle body frame F of the motorcycle of a straddle type vehicle, there are steerably supported a front fork 11 for pivotally carrying a front wheel WF and a bar-shaped steering handle 12 connected to the front fork 11. An engine body 13 of an engine E that creates power for driving a rear wheel WR suspended by a rear part of the vehicle body frame F is mounted on the vehicle body frame F in such a manner as to be located between the front wheel WF and the rear wheel WR.

On the vehicle body frame F there are supported a fuel tank (not shown) arranged above the engine body 13 and a tandem type riding seat 17 having a driver's seat 15 and a pillion seat 16 behind the driver's seat 15, such that the riding seat 17 is located on a rear side of the fuel tank.

A portion of the engine E, inclusive of the fuel tank and a portion of the vehicle body frame F, is covered with a body cowl 18. This body cowl 18 comprises a front cowl 19 for covering a front end portion of the vehicle body frame F on a forward side above the front wheel WF, side cowls 20 connected to both left and right sides of the front cowl 19 in such a manner as to be arranged above the engine body 13, a tank shelter 21 connected to each of rear portions of the side cowls 20 to cover the fuel tank arranged in front of the riding seat 15, left and right of side covers 22 arranged below a front portion of the riding seat 17 and connected to a rear portion of the tank shelter 21, left and right seat cowls 23 connected to the side covers 22 to cover a rear portion of the riding seat 15 on a lateral side, and a rear cowl 24 connected to each of rear portions of the seat cowls 23.

On a rear part of the vehicle body frame F there are supported grab rails 25 that project upwardly on the left and right sides of the pillion seat 16 of the tandem type riding seat 17. Left and right pannier cases 26 arranged below the rear portion of the riding seat 17 are supported on the rear part of the vehicle body frame F in such a manner as to be opened and closed.

Figure 2:
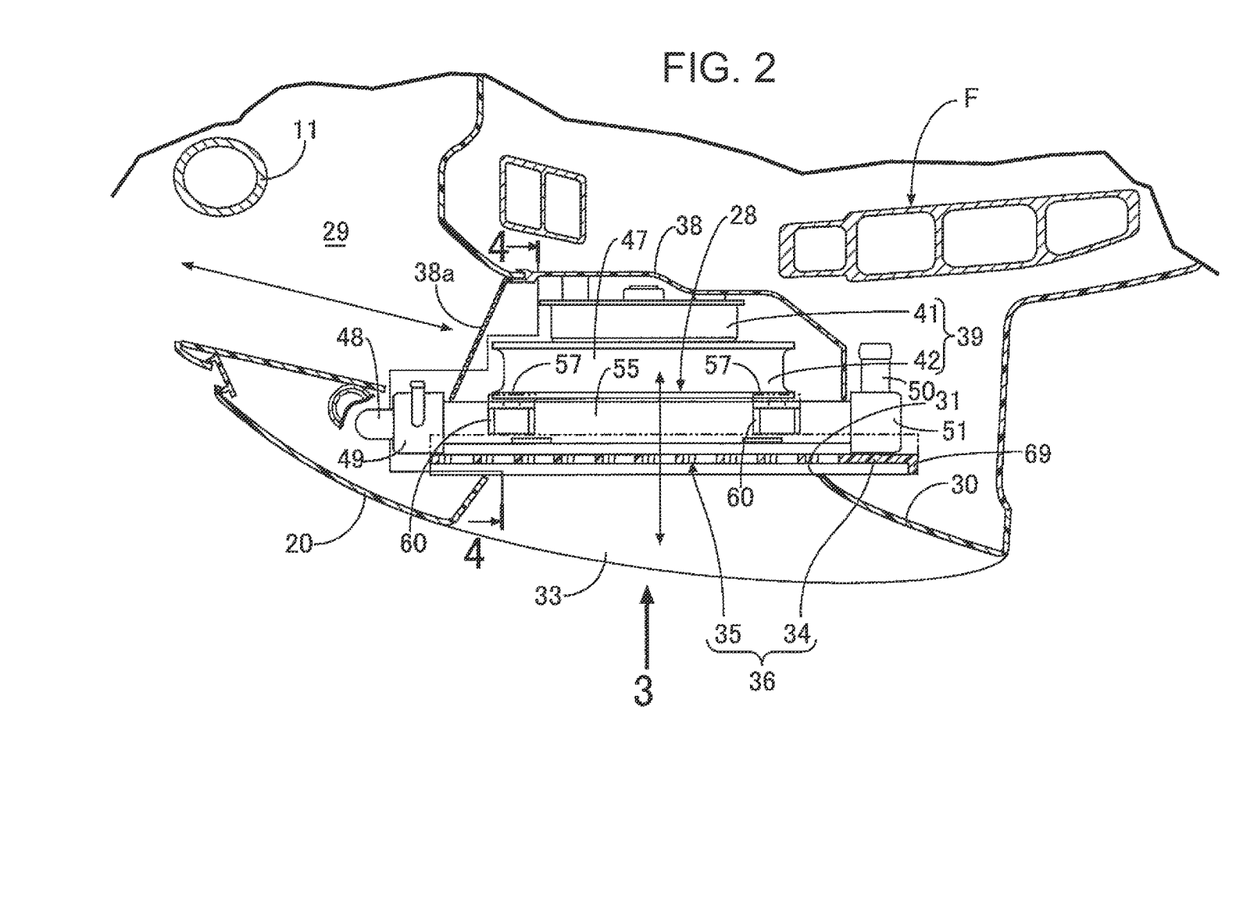
FIG. 2 is an enlarged cross sectional view taken on line 2-2 of FIG. 1.

In FIG. 2, radiators 28 for cooling a coolant flowing from the engine body 13 are arranged on both front lower sides of a driver sitting on the driver's seat 15 of the riding seat 17, in such a manner as to be covered with the side cowls 20. A cooling air intake 29 for guiding traveling air to the radiators 28 is opened between the left and right side cowls 20 and below the front cowl 19.

Figure 3:
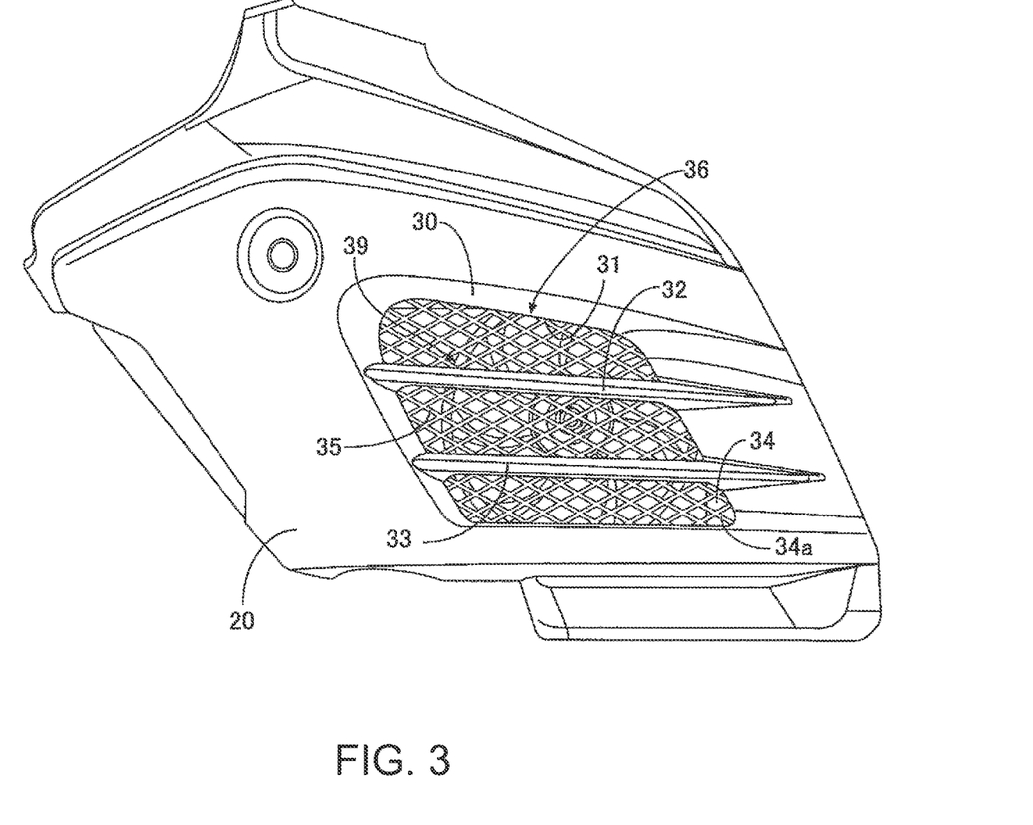
FIG. 3 is a view in the direction of an arrow 3 of FIG. 2.

Referring to FIG. 3 at the same time, the side cowl 20 functioning as a cover member provided on a lateral side of the vehicle body is integrally provided with an air guide duct 30 that has an inner opening 31 being opened in a face-to-face relationship with the radiator 28 from the outside and that guides hot air from the radiator 28 outwardly of the vehicle body. Also, a plurality of bridges, for example, two bridges 32, 33 for reinforcing the air guide duct 30 and regulating the air flow flowing through the air guide duct 30, are provided integral with the side cowl 20 in such a manner as to leave a space in an upward and downward direction and to traverse the air guide duct 30 in a forward and rearward direction.

Figure 4:
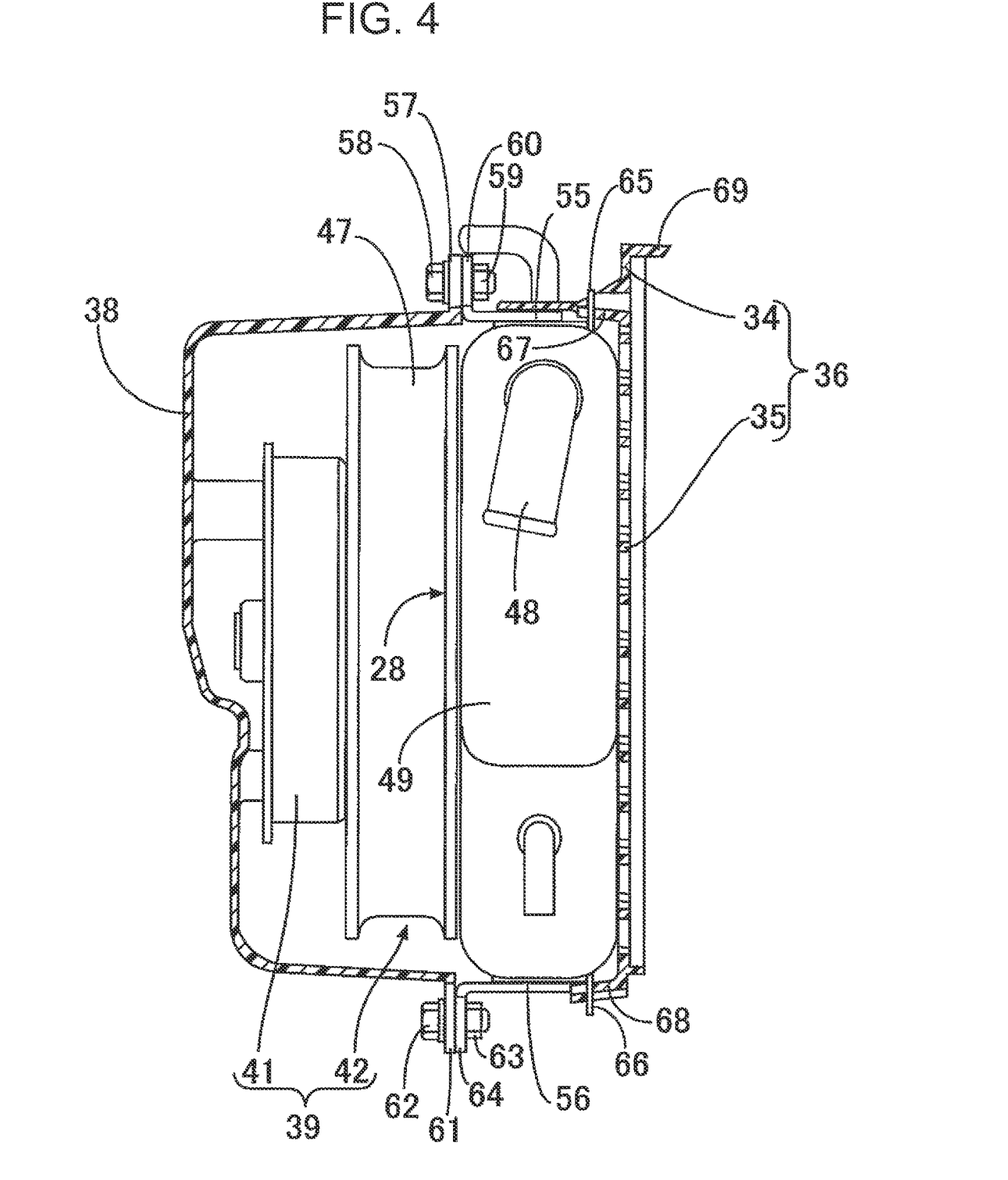
FIG. 4 is a cross sectional view taken on line 4-4 of FIG. 2.

Referring to FIG. 4 at the same time, in a position adjacent to the radiator 28 there is arranged a ventilation control member 34 that controls the cooling air passing through the radiator 28 so as to flow into the inner opening 31 of the air guide duct 30. In this embodiment, an assembly unit 36 comprised of the ventilation control member 34 and the grille 35, which are formed integral with each other, is interposed between the radiator 28 and the air guide duct 30. Moreover, behind the front wheel WF there is arranged a front fender 37 for preventing mud from being splashed up from the front wheel WF to the rearward engine body 13. On both the left and right sides of the front fender 37 there are continuously provided air guide cases 38 for guiding air from the air intake 29 to the radiator 28.

Figure 5:
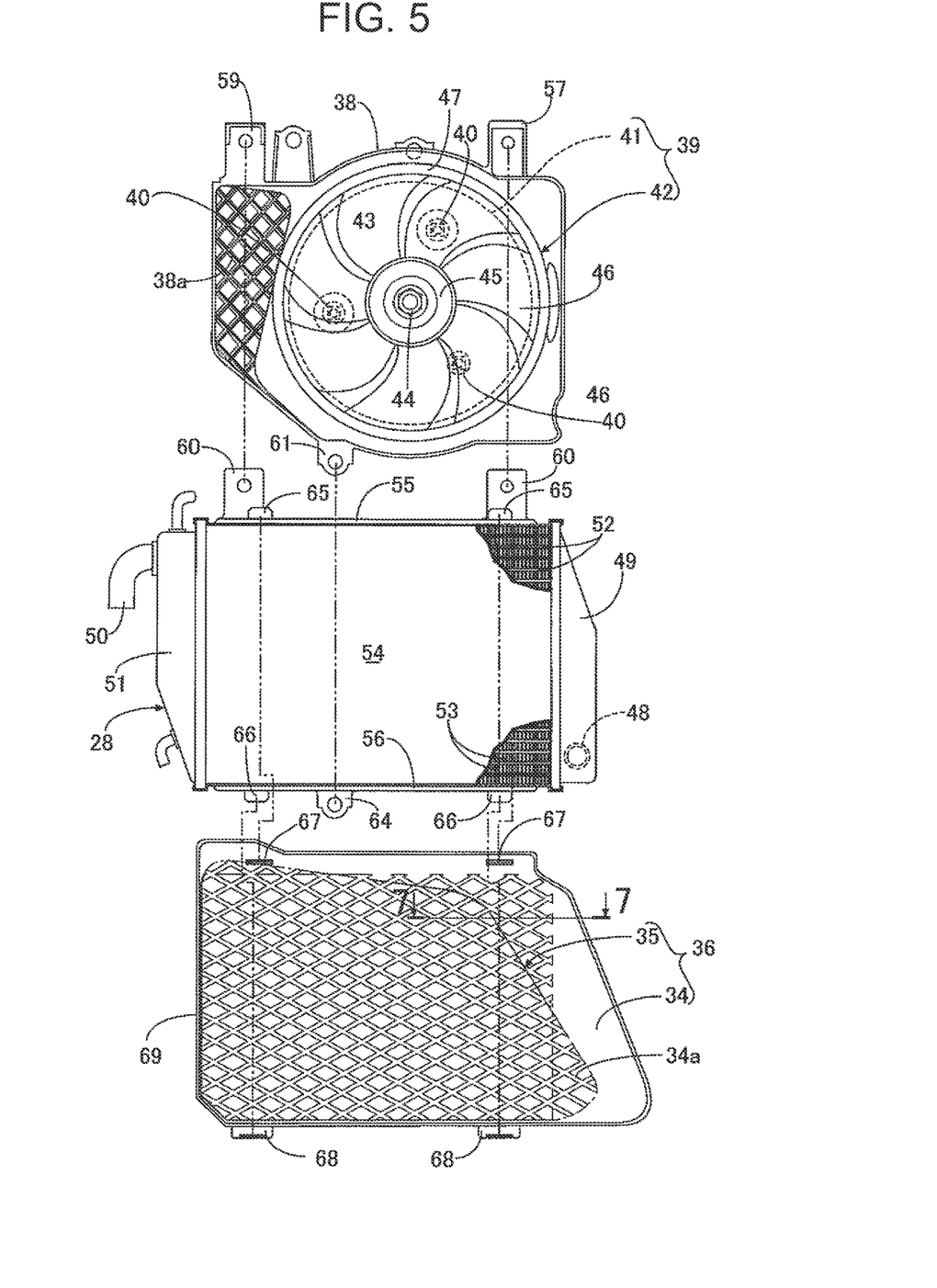
FIG. 5 is an exploded side view showing an air guide case, a radiator and an assembly unit.
Figure 6:
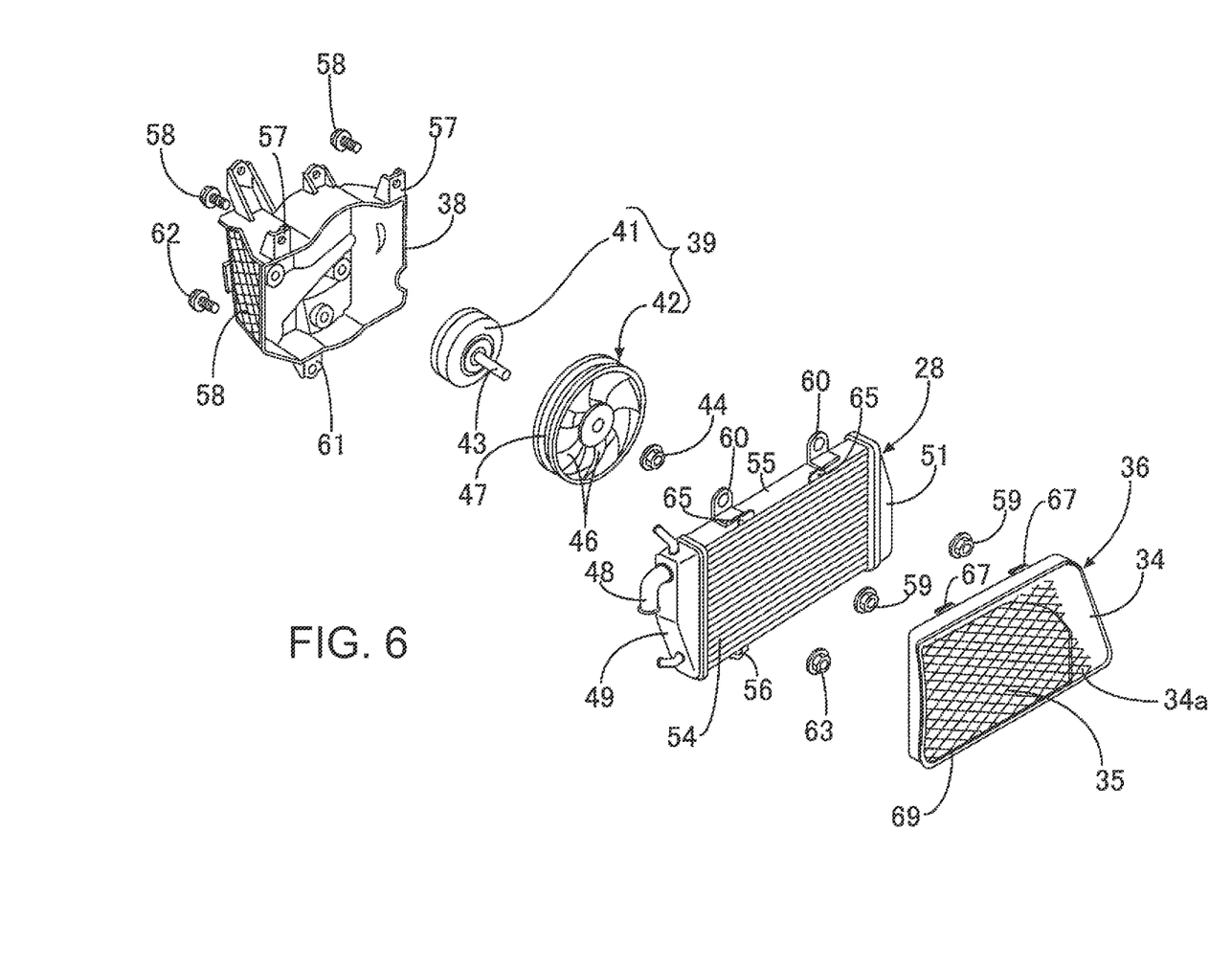
FIG. 6 is an exploded perspective view showing a casing, an electric fan, the radiator and the assembly unit.

Referring to FIG. 5 and FIG. 6 at the same time, the air guide case 38 is arranged inward in the vehicle width direction with respect to the radiator 28 and formed in the shape of a bowl opened on the side of the radiator 28. A lateral wall of this air guide case 38 facing the air intake 29 is integrally formed with a reticulated grille section 38a for permitting a flow of air between the air intake 29 and an inside of the air guide case 38.

On an inside in the vehicle width direction of the radiator 28 there is arranged an electric fan 39 for discharging air that is drawn or sucked from the air guide duct 30 and passes through the radiator 28, forwardly from the cooling air intake 29, when the cooling by the traveling air of the radiator 28 is not expected due to a traffic jam, etc. The electric fan 39 comprises an electric motor 41 that is fastened against nuts 40 fixedly provided in a plurality of positions, for example three positions, and a fan 42 that is driven by the electric motor 41. The fan 42 includes a boss 45 which is tightened against an output shaft 43 of the electric motor 41 by a nut 44, blades 46, 46 that are fixedly provided on the boss 45 at regular intervals in a circumferential direction thereof, and a connecting ring 47 that connects each of outer ends of the blades 46, 46.

Referring particularly to FIG. 5, the radiator 28 includes an inlet side tank 51 having an inlet pipe 50, an outlet side tank 49 having an outlet pipe 48, a core 54 being formed such that a plurality of water pipes 52, 52 and a plurality of cooling fins 53, 53 are arranged alternately and connected to each other, the core 54 being located between the inlet side tank 51 and the outlet side tank 49, and a pair of side plates 55, 56 being arranged on both sides of the core 54 so as to protect the core 54 and located between the inlet side tank 51 and the outlet side tank 49.

The radiator 28 is formed of a side flow type that has the inlet side tank 51 arranged rearwardly of the core 54 while having the outlet side tank 49 forward of the core 54 and that the plurality of water pipes 52, 52 are extended in the forward and rearward direction of the vehicle so as to allow the coolant to flow in the forward and rearward direction of the vehicle between the inlet side tank 51 and the outlet side tank 49. The side plates 55, 56 are arranged so as to sandwich the core 54 in the upward and downward direction.

The upper side plate 55 is provided with a pair of supporting projections 60, 60 to which a pair of mounting projections 57, 57 extending upwardly from an upper portion of the air guide case 38 is fastened with screw members 58, 58 and nuts 59, 59. The lower side plate 56 also is provided with a supporting projection 64 to which a mounting projection 61 extending downwardly from a lower portion of the air guide case 38 is fastened with a screw member 62 and a nut 63.

Further, on the side of the radiator 28, the grille 35 is formed in a reticulate shape so as to prevent foreign matter from entering through the air guide duct 30 and arranged close to and face-to-face with the core 54 of the radiator 28 in a cooling air introducing direction (from the outside in the vehicle width direction in this embodiment). The ventilation control member 34 formed in a flat shape is formed integral with the grille 35 whereby to make up the assembly unit 36.

The side plates 55, 56 are integrally formed with forward and rearward claw or hook portions 65, 65; 66, 66 each arranged in pairs so as to project toward the air guide duct 30. On an upper part of the assembly unit 36, integrally made up of the ventilation control member 34 and the grille 35, there is integrally formed a pair of engaging projections 67, 67 into which the upper claw or hook portions 65, 65 are inserted from the lower side so as to be engaged therewith, while on a lower part of the assembly unit 36 there is integrally formed a pair of engaging projections 68, 68 into which the lower claw or hook portions 66, 66 are inserted from the upper side so as to be engaged therewith. In addition, an extending wall 69 extending toward the air guide duct 30 is integrally provided on an outer periphery of the assembly unit 36.

By the way, the inner opening 31 of the air guide duct 30 is formed in such a configuration that the traveling air flows around at least a portion of all the water pipes 52 of the radiator 28. The air guide duct 30 has a transverse cross sectional configuration inclined downwardly and rearwardly in a side view such that a portion of the core 54 of the radiator 28 excluding at least a rear upper portion thereof faces the air guide duct 30. In this embodiment, a portion of the core 54 excluding the rear upper portion and a front lower portion thereof faces the air guide duct 30. On the other hand, the ventilation control member 34 is formed to close the rear upper portion of the core 54 of the radiator 28, in a side view.

According to this construction of the air guide duct 30 and the ventilation control member 34, although the traveling air passing through the front lower portion of the core 54 may flow into a front part of the side cowl 20, the traveling air passing through the core 54 of the radiator 28 via the air guide case 38 from the cooling air intake 29 has a tendency to flow largely to the rearward side of the core 54. Therefore, there is no possibility of causing the thermal influence, even if a small amount of the traveling air passing through the front lower portion of the core 54 flows into the front part of the side cowl 20.

Figure 7:
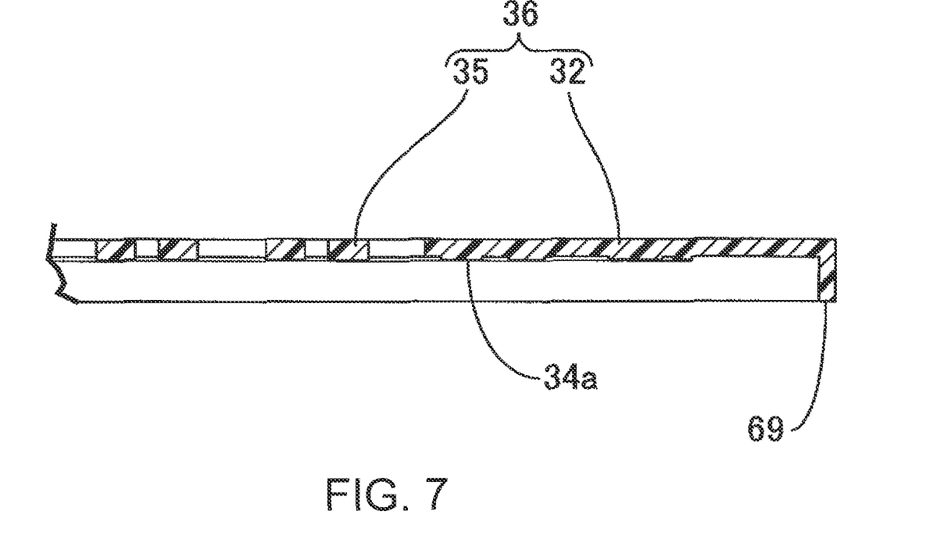
FIG. 7 is an enlarged cross sectional view taken on line 7-7 of FIG. 5.

As clearly shown in FIG. 7, on a portion of the ventilation control member 34 facing the air guide duct 30 there is integrally formed a reticulated protrusion 34a, which is connected to the reticulated grille 35.

Next, operation of this embodiment will be described. The ventilation control member 34, which controls the cooling air passing through the core 54 of the radiator 28 so as to flow toward the inner opening 31 of the air guide duct 30 formed integral with the side cowl 20 covering the radiator 28, is arranged close to the radiator 28 and, in this embodiment, interposed between the radiator 28 and the air guide duct 30. Therefore, even in the case where the air guide duct 30 is opened face-to-face with only a portion of the core 54, it is possible to restrain the hot air from staying within the side cowl 20 whereby to prevent the thermal influence causing due to the stay or retention of the hot air.

Moreover, the left and right radiators 28 are arranged on both front lower sides of the vehicle driver so as to be covered with the side cowl 20. The cooling air intake 29 for guiding the traveling air to the radiator 28 is opened between the left and right side cowls 20 and below the front cowl 19, and the air guide duct 30 is formed integral with the side cowl 20. With this construction, it is possible to restrain the stay of the hot air within the side cowl 20, that has a great thermal influence on the driver, whereby to prevent the thermal influence caused by the retention or stay of the hot air.

Since the ventilation control member 34 is attached to the radiator 28, the positional accuracy of the ventilation control member 34 relative to the radiator 28 can be improved and the accuracy of controlling the orientation of the cooling air can be improved.

Further, the electric fan 39 is arranged inward in a vehicle width direction of the radiator 28 for discharging air sucked through the air guide duct 30, from the cooling air intake 29. The grille 35 is formed in a reticulated shape for preventing the foreign matter from entering the radiator 28 side and arranged close to and face-to-face with the core 54 of the radiator 28 from the outside in the vehicle width direction, and the ventilation control member 34 of a flat plate shape is formed integral with the grille 35. With this construction, the grille 35 and the ventilation control member 34 each are arranged close to the core 54 of the radiator 28 so that the effect due to such arrangement of these members 35, 34 can be increased. In addition, this effect is able to be performed by a single part and thereby contributes to a reduction in the number of parts.

Further, the radiator 28 includes the inlet side tank 51 having the inlet pipe 50, the outlet side tank 49 having the outlet pipe 48, the core 54 being located between the inlet side tank 51 and the outlet side tank 49 and formed such that the plurality of water pipes 52, 52 and the plurality of cooling fins 53, 53 are arranged alternately and connected to each other, and the pair of side plates 55, 56 being arranged on both sides of the core 54 so as to protect the core 54 and located between the inlet side tank 51 and the outlet side tank 49, wherein the side plates 55, 56 are integrally provided with the claw portions 65, 65; 66, 66 for attaching the ventilation control member 34 and the grille 35 thereto. With this construction, when the ventilation control member 34 and the grille 35 are attached to the side plates 55, 56, which are adjacent to the core 54 and assembled simultaneously with the core 54, the ventilation control member 34 and the grille 35 formed integral with the ventilation control member 34 can be arranged adjacent to the core 54 while improving the positional accuracy relative to the core 54.

Further, since the extending wall 69 extending toward the air guide duct 30 is provided on the outer periphery of the assembly unit 36 comprising the ventilation control member 34 and the grille 35 formed integral with the ventilation control member 34, the hot air passing through the radiator 28 can be guided more assuredly to the air guide duct 30 side, whereby to prevent the hot air from leaking in the side cowl 20.

Moreover, since the reticulated protrusion 34a, which is connected to the reticulated grille 35 is formed integral with a portion of the ventilation control member 34 facing the air guide duct 30, it is possible to improve the rigidity of the ventilation control member 34 while lightening the weight thereof. It is also possible to improve the design quality when the air guide duct 30 is viewed from the outside.

Further, the tank shelter 21 for covering a fuel tank arranged in front of the riding seat 17 is connected to the rear portion of the side cowl 20. The side cover 22 arranged below the front portion of the riding seat 17 is connected to the rear portion of the tank shelter 21. The air guide duct 30 has a transverse cross sectional configuration inclined downwardly and rearwardly in a side view such that a portion of the core 54 of the radiator 28 excluding at least the rear upper portion thereof faces the air guide duct 30, and the ventilation control member 34 is formed to close the rear upper portion of the core 54 of the radiator 28 in a side view. With this construction, although the rider sitting on the riding seat 17 may directly contact the tank shelter 21 and the side cover 22, it is possible to effectively restrain the hot air from staying within the tank shelter 21 and the side cover 22.

Furthermore, since the radiator 28 is formed of the side flow type having the plurality of water pipes 52, 52 for carrying the coolant in the forward and rearward direction of the vehicle, and the inner opening 31 of the air guide duct 30 is formed such that the traveling air flows around at least a portion of all the water pipes 52, 52 of the radiator 28, the cooling performance of the radiator 28 can be maintained.

While the present invention has been described in its preferred embodiment, it is to be understood that the present invention is not limited to the above described embodiment, and that various changes and modifications may be made without departing from the scope of the present invention delineated by the following claims.

For example, the invention may include the case where the radiator is arranged facing forward of the vehicle. In addition, the present invention may also be applied to the case where the radiator is arranged inwardly in the vehicle width direction.

DESCRIPTION OF REFERENCE CHARACTERS

13 Engine body
17 Riding seat
19 Front cowl
20 Side cowl (Cover member)
21 Tank shelter
22 Side cover
28 Radiator
29 Cooling air intake
30 Air guide duct
31 Inner opening
34 Ventilation control member
34a Reticulated protrusion
35 Grille
36 Assembly unit
39 Electric fan
48 Outlet pipe
49 Outlet side tank
50 Inlet pipe
51 Inlet side tank
52 Water pipe
53 Cooling fin
54 Core
55, 56 Side plate
65, 66 Claw portion
69 Extending wall

What is claimed is:

1. A ventilation structure of a radiator in a straddle type vehicle, comprising:
   a radiator for cooling a coolant led from an engine body,
   a cover member provided on a lateral side of a vehicle body for covering the radiator,
   an air guide duct having an inner opening that is opened face-to-face with the radiator on the lateral side of the vehicle body and being formed integral with the cover member so as to guide hot air from the radiator outwardly of the vehicle,
   a ventilation control member attached to the radiator for controlling cooling air passing through a core of the radiator so as to flow toward the inner opening of the air guide duct,
   a grille arranged forward in a vehicle longitudinal direction of the ventilation control member and outwardly in a vehicle width direction of the radiator, the ventilation control member and the grille being interposed between the radiator and the air guide duct, and
   an extending wall integrally provided on the ventilation control member, the extending wall extending in a vehicle height direction along a rear outer periphery of the ventilation control member and in the vehicle width direction toward the air guide duct, the extending wall located rearward in the vehicle longitudinal direction of the inner opening and covered in a vehicle side view by a rear portion of the cover member,
   wherein the ventilation control member of a flat plate shape is formed integral with the grille, and a reticulated protrusion formed integral with a portion of the ventilation control member facing the air guide duct is connected to the grille.

2. The ventilation structure of a radiator in a straddle type vehicle according to claim 1, wherein the grille is formed in a reticulated shape for preventing foreign matter from entering the radiator and which is arranged close to and face-to-face with the core of the radiator in a cooling air introducing direction.

3. The ventilation structure of a radiator in a straddle type vehicle according to claim 2, wherein the radiator includes an inlet side tank having an inlet pipe, an outlet side tank having an outlet pipe, the core being located between the inlet side tank and the outlet side tank and formed such that a plurality of water pipes and a plurality of cooling fins are arranged alternately and connected to each other, and a pair of side plates being arranged on both sides of the core so as to protect the core and located between the inlet side tank and the outlet side tank, wherein the side plates are integrally provided with a claw portion for attaching the ventilation control member and the grille thereto.

4. The ventilation structure of a radiator in a straddle type vehicle according to claim 2, wherein the extending wall is integrally provided on an outer periphery of an assembly unit comprising the ventilation control member and the grille formed integral with the ventilation control member.

5. The ventilation structure of a radiator in a straddle type vehicle according to claim 3, wherein the extending wall is integrally provided on an outer periphery of an assembly unit comprising the ventilation control member and the grille formed integral with the ventilation control member.

6. A ventilation structure of a radiator in a straddle type vehicle, comprising:
   left and right radiators being adapted to cool a coolant led from an engine body and arranged on both front lower sides of a vehicle driver so as to be covered with a side cowl,
   a cooling air intake being adapted to guide traveling air to the radiators and provided between a pair of left and right side cowls and below a front cowl,
   an air guide duct having an inner opening that is opened face-to-face with the radiator from the outside in a vehicle width direction and being formed integral with the side cowl so as to guide hot air from the radiator in an outward direction of a vehicle,
   a grille arranged outwardly in the vehicle width direction of the radiator, and
   a ventilation control member for controlling cooling air passing through a core of the radiator so as to flow toward the inner opening of the air guide duct, wherein the ventilation control member is provided rearward in a vehicle longitudinal direction of the grille and outwardly in the vehicle width direction of the radiator, wherein the ventilation control member includes a base portion of a flat plate shape, the base portion is formed integral with and extends along a periphery of a rear portion of the grille in side view and has an outer surface coplanar with an outer surface of the grille,
   wherein the grille is formed in a reticulated shape defined by spaced projections extending outwardly in the vehicle width direction, the grille preventing foreign matter from entering the radiator side and arranged close to and face-to-face with the core of the radiator from the outside in the vehicle width direction, and a reticulated protrusion formed integral with a portion of the ventilation control member facing the air guide duct is connected to the grille.

7. The ventilation structure of a radiator in a straddle type vehicle according to claim 6, further comprising an electric fan that is arranged inwardly in the vehicle width direction of the radiator for discharging air sucked through the air guide duct, from the cooling air intake.

8. The ventilation structure of a radiator in a straddle type vehicle according to claim 6, further comprising a tank shelter being adapted to cover a fuel tank arranged in front of a riding seat and connected to a rear portion of the side cowl, and a side cover being arranged below a front portion of the riding seat and connected to a rear portion of the tank shelter, wherein the air guide duct has a transverse cross sectional configuration inclined downwardly and rearwardly in a side view such that a portion of the core of the radiator excluding at least a rear upper portion thereof faces the inner opening of the air guide duct, and the ventilation control member is formed to close the rear upper portion of the core of the radiator in a side view.

9. The ventilation structure of a radiator in a straddle type vehicle according to claim 7, further comprising a tank shelter being adapted to cover a fuel tank arranged in front of a riding seat and connected to a rear portion of the side cowl, and a side cover being arranged below a front portion of the riding seat and connected to a rear portion of the tank shelter, wherein the air guide duct has a transverse cross sectional configuration inclined downwardly and rearwardly in a side view such that a portion of the core of the radiator excluding at least a rear upper portion thereof faces the inner opening of the air guide duct, and the ventilation control member is formed to close the rear upper portion of the core of the radiator in a side view.

10. The ventilation structure of a radiator in a straddle type vehicle according to claim 6, wherein the radiator is formed of a side flow type having a plurality of water pipes for carrying the coolant in a forward and rearward direction of the vehicle, and the inner opening of the air guide duct is formed such that the traveling air flows around at least a portion of all the water pipes of the radiator.

11. The ventilation structure of a radiator in a straddle type vehicle according to claim 7, wherein the radiator is formed of a side flow type having a plurality of water pipes for carrying the coolant in a forward and rearward direction of the vehicle, and the inner opening of the air guide duct is formed such that the traveling air flows around at least a portion of all the water pipes of the radiator.

12. The ventilation structure of a radiator in a straddle type vehicle according to claim 8, wherein the radiator is formed of a side flow type having a plurality of water pipes for carrying the coolant in a forward and rearward direction of the vehicle, and the inner opening of the air guide duct is formed such that the traveling air flows around at least a portion of all the water pipes of the radiator.

13. The ventilation structure of a radiator in a straddle type vehicle according to claim 9, wherein the radiator is formed of a side flow type having a plurality of water pipes for carrying the coolant in a forward and rearward direction of the vehicle, and the inner opening of the air guide duct is formed such that the traveling air flows around at least a portion of all the water pipes of the radiator.

* * * * *